Jan. 5, 1937. J. P. WATSON 2,066,499
RANGE FINDING DEVICE
Filed March 2, 1933 2 Sheets-Sheet 1

Jan. 5, 1937.  J. P. WATSON  2,066,499
RANGE FINDING DEVICE
Filed March 2, 1933  2 Sheets-Sheet 2

Patented Jan. 5, 1937

2,066,499

UNITED STATES PATENT OFFICE 2,066,499

RANGE FINDING DEVICE

John Percival Watson, Westminster, England, assignor to Vickers-Armstrongs Limited, Westminster, England, a British company Application March 2, 1933, Serial No. 659,342
In Great Britain March 14, 1932

3 Claims. (Cl. 33—46)

This invention relates to range finding devices for ascertaining the range of rapidly moving objects such as aeroplanes the rate of change of range of which makes it difficult to obtain accurate determination of the range at any moment with existing range finders.

According to the present invention we provide means whereby the range screw or other element the adjusted position of which is a measure of the range, is placed under the control of a member moving in accordance with the ascertained change of range as well as being under the control of the usual working head or equivalent member adjusted by the range finding operator; in this manner during the movement of the target the latter normally has the effect of being stationary or approximately so to the said operator who therefore only has to operate the working head or its equivalent to correct the adjustment for the visually ascertained departure from the ascertained change of range. The member moving in accordance with the ascertained change of range and the working head or its equivalent may operate two elements of a differential gear the third element of which operates the range screw or its equivalent in accordance with the algebraic sum of the movements of the said member and the said working head. The range screw or its equivalent which thus moves in accordance with the corrected range may operate a range indicator or a range transmitter or both an indicator and a transmitter.

In order that the said invention may be clearly understood and readily carried into effect, the same will now be described more fully with reference to the accompany drawings in which:—

Figure 1:
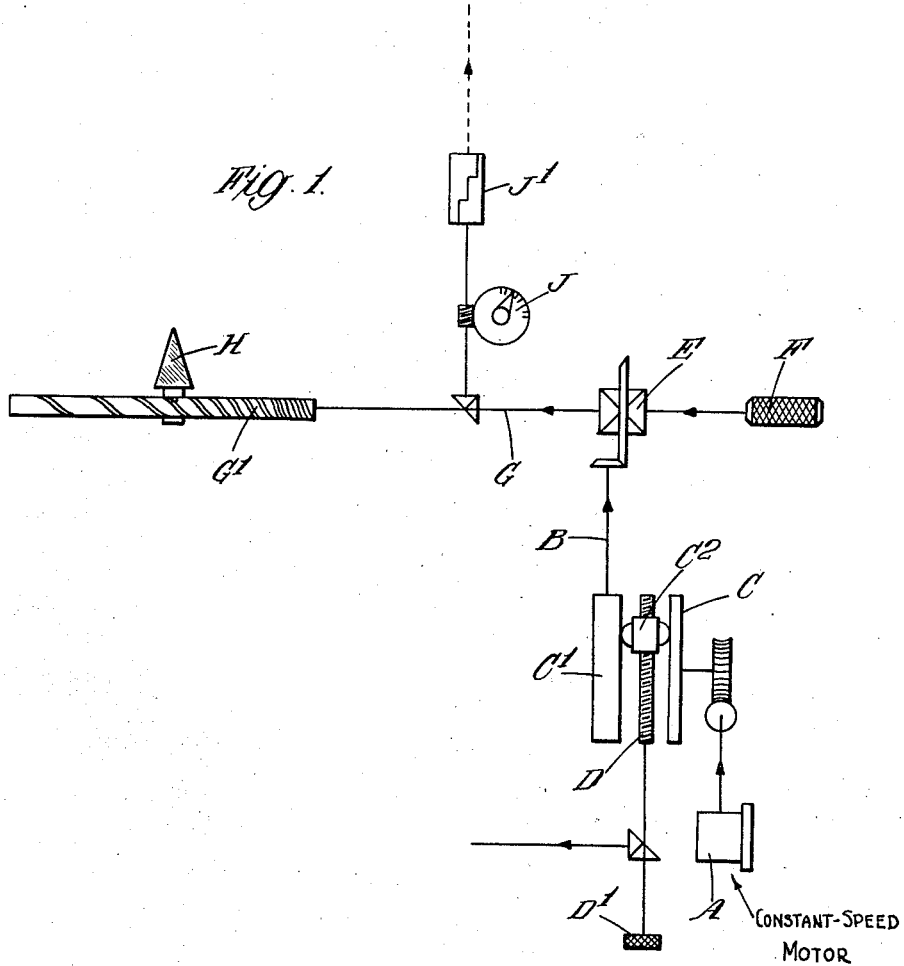
Figure 1 is a view showing diagrammatically one form of our invention.

Referring to Figure 1, a constant speed motor A operates a shaft B through a variable speed drive comprising a driving disc C, a driven roller C' and a ball carrier $C^2$ interposed between the disc and the roller. The ball carrier is adjustable as to its distance from the axis of the disc C by a screw-threaded shaft D rotated by a knob D', the distance of the said carrier from the axis of the disc being in accordance with the rate of change of range. The shaft B, which thus moves in accordance with the change of range (i. e. the generated range), operates one element of a differential gear E the second element of which is driven by a knob F constituting the working head of the range finder. The third or result element of the said differential gear operates a shaft G which thus receives movement in accordance with the algebraic sum of the movements of the shaft B and the working head F. The outer portion G' of the shaft G is formed with a cam groove with which engages a pin in the carrier of the prism H of the range finder, the form of the cam groove being such that, with the shaft G rotating proportional to the range (R), the distance of the prism from the outer end of the cam groove is proportional to $$\frac{1}{R}$$

The shaft G drives a range indicating dial J and also a range transmitter J'.

In operation the range finding operator adjusts the working head F to move the prism H for ascertaining the initial range, after which the knob D' is adjusted until the target appears to be stationary to the operator who then has only to correct the adjustment by means of the working head F for any visually ascertained departure from the ascertained change of range.

Figure 2:
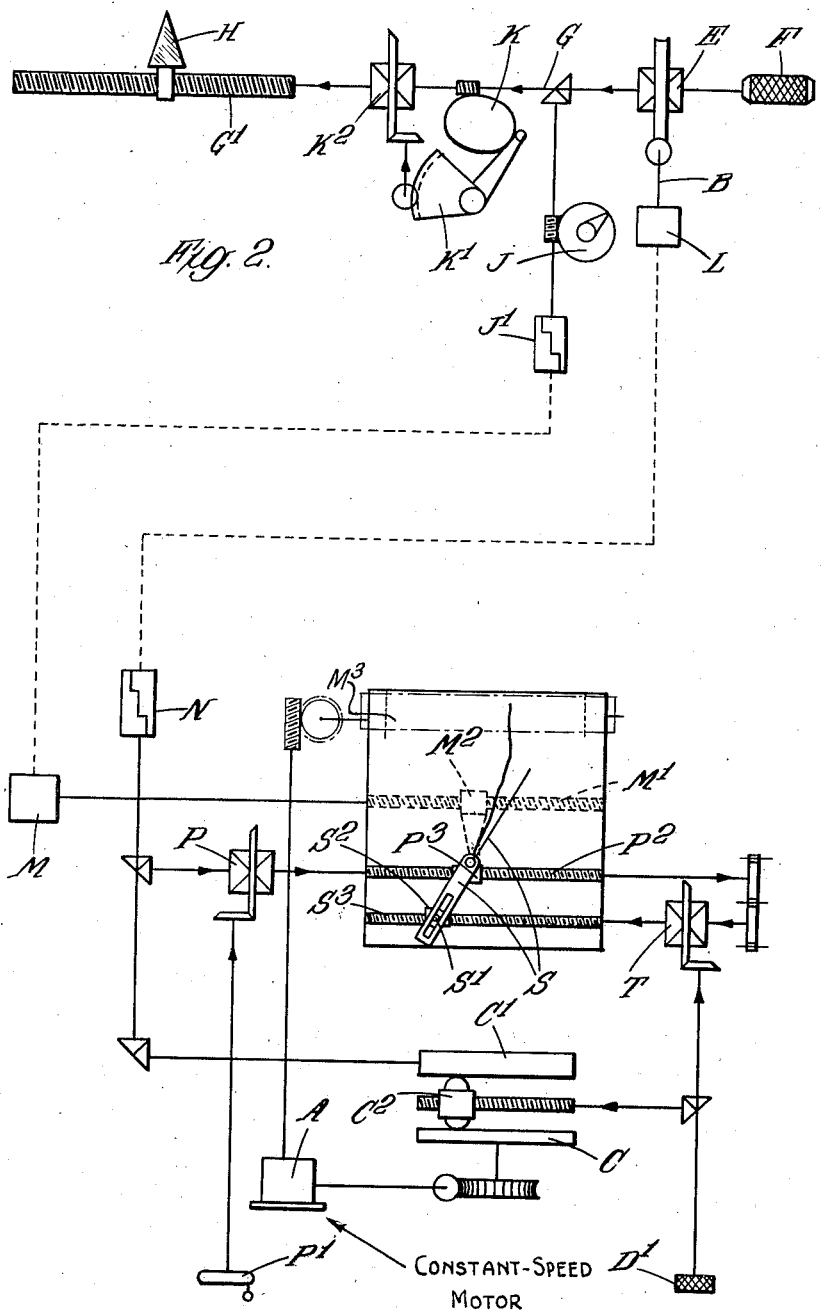
Figure 2 is a view showing diagrammatically another form of our invention.

The upper part of Figure 2 shows a construction whereby the portion G' of the shaft G can be provided with an ordinary helical screw thread of constant pitch as distinct from the variable pitch cam groove of Figure 1; in this construction a conversion gear is interposed between the shaft G driven by the third or result element of the differential gear E, and the screw threaded portion G'. This conversion gear comprises, in the example shown, a cam K which is operated through worm gearing from the shaft G and the profile of which is based upon the difference between R and $$\frac{1}{R}$$

This cam operates a toothed quadrant K' which in turn operates one element of a differential gear $K^2$. The second element of this differential gear is operated by the shaft G and the third or result element rotates the screw threaded portion G'.

The shaft B of Figure 2 can be driven by the mechanism shown in Figure 1 but is illustrated as being driven by a motor L operated from the control apparatus shown at the lower part of Figure 2. This apparatus comprises a motor M driven by the range transmitter J' and a transmitter N which drives the motor L. The motor M operates a screw M' carrying a nut $M^2$ which supports a pencil in contact with one face of a range plotting chart M³ which is made of transparent material and is translated at constant speed normal to the direction of the screw M¹. The roller C¹ of the variable speed drive in this case operates the transmitter N, the disc C being driven from the constant speed motor A and the ball carrier C² being adjusted by the knob D' as in Figure 1. The roller C' also drives one element of a differential gear P, the second element of which is driven from a range tuning handle P'. The third or result element of this differential gear drives a screw P² carrying a nut P³. This nut carries the pivot of a tangent or cursor bar S one end of which is slotted to receive a pin S' on a nut S² operated by a screw S³. A second pencil arranged on the face of the chart M³ opposite to that on which the first pencil is disposed, passes through the said pivot which is offset from the axis of the screw P² to allow the pencil to clear the screw. This screw is driven by the third or result element of a compensating differential gear T; another element of this differential gear is operated by the knob D' which as aforesaid adjusts the ball carrier C² in accordance with the rate of change of range and the second element of this gear is operated through gearing from the screw P². The initial range is determined by operating the working head F and is transmitted by the transmitter J' to the motor M which through the screw M' and the nut M² causes the first pencil to indicate the range on the plotter. The second pencil is then brought into co-incidence with the indicated range by operating the tuning handle P' and as soon as the range plot has been sufficiently developed the cursor bar S is caused to assume a position tangential to the range curve by operating the knob D'. The tangent to the range curve is a measure of the rate of change of range and therefore in adjusting the cursor bar S as stated above the ball carrier C² which is also operated by the knob D' is adjusted to a position from the axis of the disc C proportional to the rate of change of range. The roller C' which consequently rotates in accordance with the change of range or generated range operates the screw P² and the second pencil as well as the transmitter N which transmits the change of range to the motor L driving the shaft B as aforesaid.

The control apparatus described above and shown at the lower part of Figure 2 can also be used in conjunction with the form of range finding device shown in Figure 1, the shaft B of the latter figure being driven by the motor L operated by the transmitter N of Figure 2 and the transmitter J' of Figure 1 operating the motor M of Figure 2.

I wish it to be understood that the expressions "range", "change of range" and "rate of change of range" herein used are intended to include any suitable functions of these values.

What I claim and desire to secure by Letters Patent of the United States is:—

1. A range finding device for ascertaining the range of rapidly moving objects such as aeroplanes, comprising a range screw, a shaft for operating the range screw, a working head adjustable by the range finding operator, a member moving in accordance with the ascertained change of range, means for operating said shaft in accordance with the algebraic sum of the movements of said working head and said member, a motor for operating said member, a transmitter operated by said shaft, and a control apparatus comprising a range keeping element said apparatus including a transmitter for controlling said motor and operated by said element, a second motor controlled by the first transmitter, range indicating means operated by said second motor controlled by the first-mentioned transmitter, and means for adjusting said element according to the indications of said range indicating means to thereby control the operation of said second transmitter.

2. A range finding device for ascertaining the range of rapidly moving objects such as aeroplanes, comprising a range screw, a shaft for operating the range screw, a working head adjustable by the range finding operator, a member moving in accordance with the ascertained change of range, means for operating said shaft in accordance with the algebraic sum of the movements of said working head and said member, a motor for operating said member, a transmitter operated by said shaft, a range plotter comprising a pencil, a nut carrying said pencil, a screw for operating said nut, a motor for driving said screw and controlled by said transmitter, a second pencil, a second nut carrying the last-mentioned pencil, a second screw for operating said second nut, a cursor bar having a slot and pivoted to said second nut, a variable speed drive, a transmitter operable by the output of said drive, said transmitter controlling the first-mentioned motor, a differential gear, the third or result element of which drives the second screw, a range-tuning handle, means whereby said handle and the said output operate the other two elements of said differential gear, a third screw, a nut engaging with said third screw, a pin carried by said nut and disposed in the slot in the cursor bar, a second differential gear the third or result element of which operates said third screw, means for driving another element of said differential gear from said second screw, a member for adjusting the adjustable element of said drive, and means for driving the remaining element of the second differential gear from the last-mentioned member.

3. A range finding device for ascertaining the range of rapidly moving objects such as aeroplanes, comprising a prism for said device, a shaft for moving the prism of the said device, a working head or its equivalent adjustable by hand by the range finding operator backwards and forwards within wide limits, a variable speed drive including an adjustable element which is adjusted in accordance with rate of change of range to vary the ratio of drive until the correct rate of change is obtained, and a driven member operable in accordance with the ascertained change of range, a constant speed motor which operates said drive, a differential gear having an adjustable element, an element actuated by said driven member, and an output element which actuates the said shaft, means whereby movements from the working head are transmitted to the adjustable element of the differential gear, a hand adjustable member other than said working head, and means whereby the movements of the hand adjustable member are transmitted to the adjustable element of the variable speed drive so that the movement of the adjustable member affects the differential gear only through the variable drive gear, whereby the working head may be adjusted by the range finding operator independently of the variable speed drive and without affecting the ratio of said drive.

JOHN PERCIVAL WATSON.